Aug. 22, 1933.   H. L. HORNING   1,923,206
INTERNAL COMBUSTION ENGINE
Original Filed July 14, 1923

Inventor
Harry L. Horning
By Brown, Jackson, Boettcher & Dienner
Attys

Patented Aug. 22, 1933

1,923,206

UNITED STATES PATENT OFFICE 1,923,206

INTERNAL COMBUSTION ENGINE

Harry L. Horning, Waukesha, Wis., assignor to Waukesha Motor Company, Waukesha, Wis., a Corporation of Wisconsin Original application July 14, 1923, Serial No. 651,503. Divided and this application December 2, 1929. Serial No. 410,907

1 Claim. (Cl. 123—191)

This invention relates to internal combustion engines, and more particularly to engines in which a combustible mixture of fuel and air is supplied, from a carburetor, to a combustion chamber and is ignited by spark means.

My invention has to do particularly with the combustion chamber and the appurtenances thereto, one of the main objects being to provide a compact turbulent producing combustion chamber particularly well adapted for use with fuel mixture inlet and burned gas outlet passages opening through the top of the chamber and controlled by overhead valves. A further object is to provide a compact combustion chamber so arranged that the spark ignition means can conveniently be located at the side of the chamber for igniting the fuel charge therein.

Further objects and advantages of my invention will appear from the detailed description:

Figure 1:
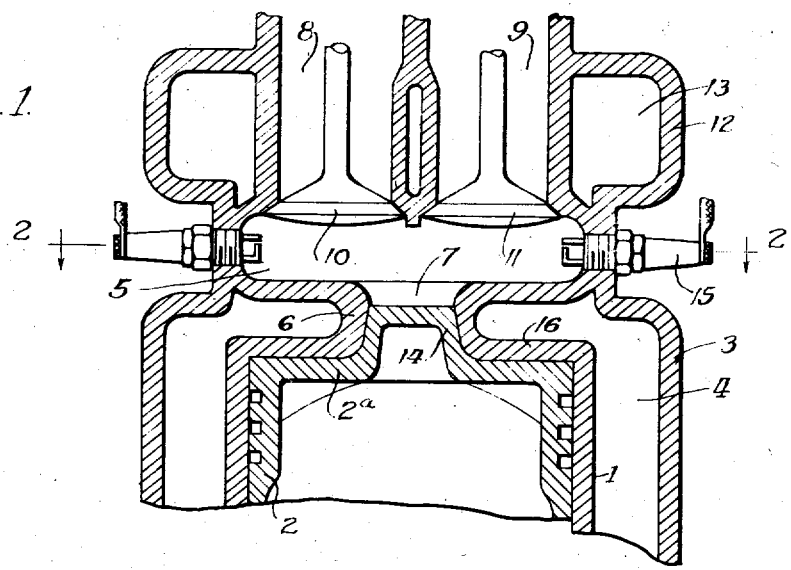
Figure 1 is a vertical sectional view through the upper portion of a cylinder and an associated combustion chamber constructed in accordance with my invention, parts being shown in elevation, the piston being shown fragmentarily and in section, taken substantially in the plane of line 1—1 of Figure 2.

This application is a division of my copending application, for Internal combustion engine, filed July 14, 1923, Serial No. 651,503.

In the particular embodiment of my invention illustrated, by way of example, I provide a cylinder 1 in which reciprocates a piston 2 in a known manner. This cylinder is spaced from a surrounding wall 3, which provides a space 4 about the cylinder, through which space a cooling medium, such as water, is circulated in a manner well understood in the art.

A combustion chamber 5 is disposed above cylinder 1 and, in the form illustrated, is formed integrally with the cylinder, though this is not essential and it may be formed otherwise. This combustion chamber is relatively thin and flat and is concentric with the cylinder, to the upper end of which it is connected by a neck 6, which defines a restricted opening 7 establishing direct communication between the combustion chamber and the cylinder.

Inlet and exhaust passages 8 and 9, respectively, open into chamber 5 through the top or roof thereof. These passages are controlled by overhead inlet and exhaust valves 10 and 11, respectively, which are operated in a manner well known in the art. The walls defining these passages are shown as formed integrally with the wall of the combustion chamber, and as spaced from an outer wall 12 which provides a space 13 about the passages and, to a certain extent, over the combustion chamber. This space communicates with the space 4 about cylinder 1 for circulation therethrough of a cooling medium.

Figure 2:
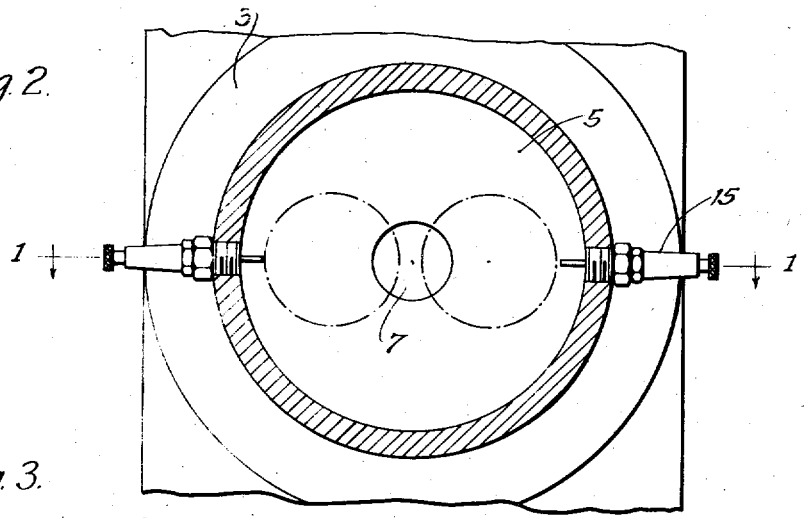
Figure 2 is a sectional view through the combustion chamber taken substantially in the plane of line 2—2 of Figure 1.

Referring more particularly to Figure 2, the opening 7 of neck 6 is disposed centrally of combustion chamber 5 and, in the form illustrated in Figure 1, piston 2 is provided, at the center of the head 2a thereof, with an upwardly projecting element 14 which, when the piston is in the position of greatest compression, that is, is in its top position illustrated in Figure 1, enters the restricted opening 7 of the neck.

The fuel charge in the combustion chamber 5 is ignited by one or more spark plugs 15 secured in the side wall of the chamber in a known manner. Preferably I provide two spark plugs which are disposed at diametrically opposite points of the combustion chamber and, preferably, adjacent the valves 10 and 11.

During the suction stroke of the piston 2, inlet valve 10 is opened and the entering charge of fuel-air mixture is drawn into the combustion chamber 5 and flows through opening 7 of neck 6 into the cylinder 1. This causes high turbulence, which is desirable. During the compression stroke of piston 2, valve 10 is closed, the exhaust valve 11 remaining closed, and the fuel-air mixture is forced into the combustion chamber through opening 7 so as to be again subjected to high turbulence. When the piston 2 reaches the position of greatest compression, or substantially so, the fuel charge in the combustion chamber is ignited by the spark plugs 15 and the piston 2 is forced downwardly due to the pressure developed incident to combustion of the fuel charge. During the return or scavenging stroke of the piston 2, the exhaust valve 11 is opened and the burnt gases are expelled through the exhaust or burnt gas outlet passage 9. This completes the cycle of operations.

By my construction I provide a compact combustion chamber which is particularly well adapted for use with overhead valves and spark ignition means, such chamber having associated therewith means whereby high turbulence of the fuel-air mixture is produced both during the suction stroke and the compression stroke of the piston, which is particularly desirable in engines of this type, that is, in engines employing a combustible fuel-air mixture and spark ignition means for initially igniting the fuel charge. In connection with the production of high turbulence, it will be noted that the underface of wall 16 at the top of cylinder 1 is parallel to the upper face of head 2a of piston 2. This assures an abrupt change in the direction of flow of the fuel-air mixture and contributes materially to the production of the desired high turbulence.

Figure 3:
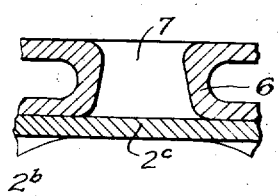
Figure 3 is a fragmentary sectional view through the top of the cylinder and the lower wall of the combustion chamber, the piston head being shown in section, illustrating a slightly modified form.

The modified form illustrated in Figure 3 is similar to that of Figure 1 with the exception that the element 14 shown in Figure 1 has been omitted, the central portion of head 2c of piston 2b being plane or flat.

What I claim is:

In an internal combustion engine of the aspiration type in which the fuel is drawn into the cylinder in a gaseous state on the suction stroke, a cylinder, a piston operating in the cylinder, a cylinder head containing a relatively thin and flat combustion chamber directly over the cylinder and extending over the cylinder area, a wall between the cylinder and the chamber and forming a flat roof over the cylinder area and normal to the cylinder axis, said wall being provided with an opening therethrough establishing communication between the cylinder and the chamber, the head being provided with burnt gas outlet and fuel mixture inlet passages opening through the roof of the chamber, overhead valves controlling said passages, and spark means extending into the chamber substantially radially thereof and disposed to ignite the fuel charge in the chamber at a point adjacent the surrounding wall of said chamber.

HARRY L. HORNING.